INVENTOR.
RALPH L. JAESCHKE
BY
Schramm, Kramer & Sturges
ATTORNEYS.

United States Patent Office 3,327,145
Patented June 20, 1967

3,327,145
DAMPING PULSATION IN ELECTROMAGNETIC
APPARATUS
Ralph L. Jaeschke, Kenosha, Wis., assignor to Eaton Yale
& Towne Inc., a corporation of Ohio
Filed Sept. 26, 1963, Ser. No. 311,683
11 Claims. (Cl. 310—93)

This application relates to rotary apparatus and drives and concerns particularly a system in which one of the elements exerts a pulsating torque or presents a pulsating opposing torque.

An object of the invention is to avoid or minimize the effects of such pulsating torque. In certain types of drives a coupling is employed in which the transmitted torque and the slip may be varied in order to control or regulate the speed of an output shaft. In the case of electromagnetic eddy-current couplings, for example, having field windings which control the slip between the driving and driven elements, the speed of the driven element may be controlled automatically by means of a speed responsive voltage generator working through a control circuit to regulate the current in the field winding. However, where the load or the prime mover has a pulsating torque there is a tendency for pulsation in the speed of the speed responsive voltage generator to introduce pulsations into the slip coupling.

It is accordingly an object of the invention to overcome these pulsations effects and to enable the slip coupling to be controlled more nearly in accordance with the average speed of the drive.

Other and further, objects, features and advantages of the invention will become apparent as the description proceeds.

In carrying out the invention in accordance with a preferred form thereof a conventional dynamo electric translating device is employed having a field winding the current in which controls the torque exerted between a stator and a rotor. In addition a speed-responsive or tachometer voltage generator, in conjunction with a suitable control circuit, is employed to maintain a predetermined rotor shaft speed. However, instead of mechanically connecting the tachometer generator directly to the shaft, the speed of which is to be controlled, an auxiliary slip coupling is interposed between this shaft and the tachometer generator.

In a preferred form of the invention the latter coupling takes the form of an electromagnetic eddy-current slip coupling having a field winding supplied with adjustable current to enable an adjustment to be made in the torque and therefore the slip between the tachometer generator and the shaft the speed of which is to be maintained. In this manner an adjustable degree of damping is interposed between the tachometer generator and the shaft in question to overcome or minimize the effect of torque pulsations in a prime mover or in a load connected to the dynamo electric translating device.

A better understanding of the invention will be afforded by the following detailed description considered in conjunction with the accompanying drawing in which.

Like reference characters are utilized throughout the drawing to designate like parts.

Figure 1:
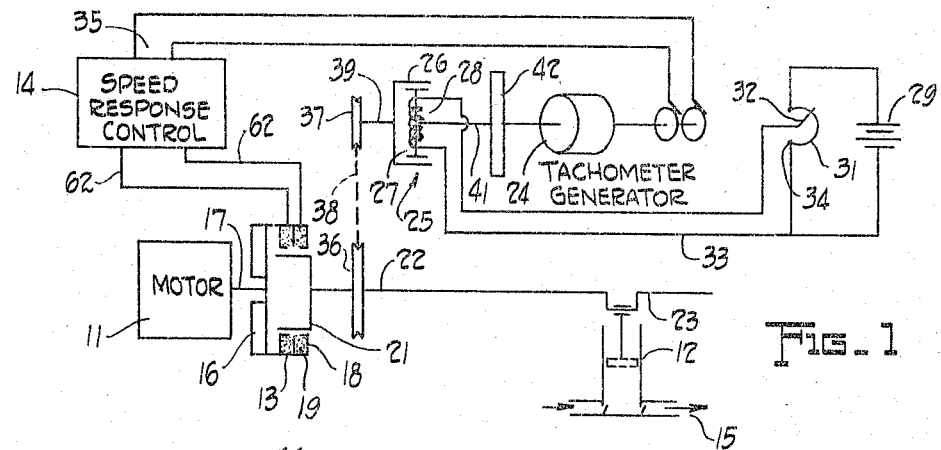
FIG. 1 is a circuit diagram of an embodiment of the invention employed to minimize the effects of the pulsations in the torque required to overcome the load of a reciprocating device such as a pump.

In the arrangement illustrated in FIG. 1 there is a motor of any conventional type such as an alternating-current, electric, induction motor 11 driving a load 12 of a character requiring the application of pulsating torque to overcome the resistance of the load, such as a reciprocating device of the nature of a pump for example. The load 12 is driven by the motor 11 through a coupling 13 of a type which may be provided with a speed-responsive control 14 for the purpose of maintaining constancy of the average speed of the load 12 independently of variations of the pressure against which the pump output line 15 is obliged to work or, within reason, variations in speed of the motor 11, or for other causes.

This is accomplished by control of the magnitude of the slip between the elements of the coupling 13 and the magnitude of the torque transmitted thereby. Couplings such as the coupling 13 do not constitute a part of the present invention but it may take the form of electromagnetic eddy-current slip coupling of the general type and principle of operation described for example in Patent No. 2,630,467 to Winther. In the form of electromagnetic slip coupling illustrated schematically in FIG. 1 there is a fly wheel 16, driven by the motor 11, shown for convenience as direct coupled to the shaft 17 of the motor 11, carrying also a field structure 18 including suitable laminated magnetic pole pieces and a magnetizing or field winding 19 connected to the speed responsive control 14.

Figure 2:
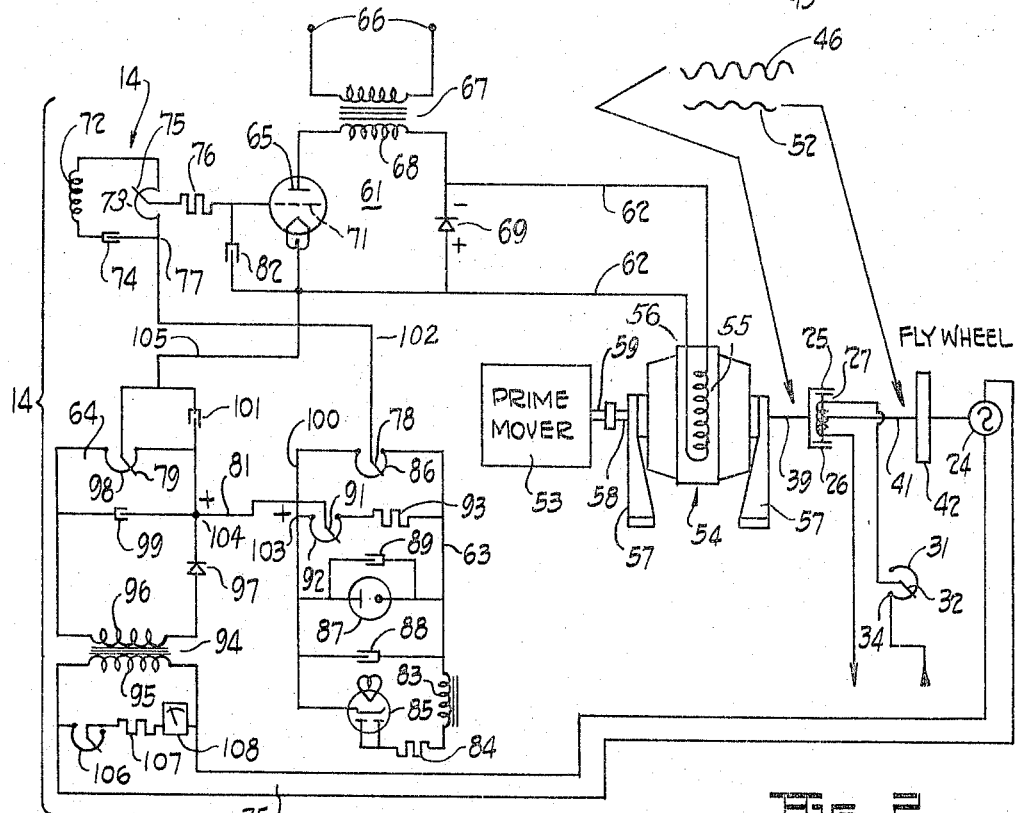
FIG. 2 is a circuit diagram of another embodiment of the invention employed to overcome the effect of pulsations in torque exerted by a prime mover such as a reciprocating, internal combustion or other engine.

The invention is not limited to the use of a specific speed-responsive control circuit but a suitable circuit for the unit 14 is illustrated in FIG. 2 which will be described in greater detail hereinafter. The slip coupling unit 13 also includes a second rotatable element 21 taking the form of an inductor connected to an output shaft 22. In the illustrative embodiment of FIG. 1 the output 22 is connected to a crank 23 forming a part of the pump forming the load 12.

Customarily in speed regulating apparatus of the type represented by the coupling 13 and the speed responsive control circuit 14, the output shaft such as the shaft 22 is connected to a tachometer generator which supplies an input voltage to the speed responsive control circuit 14 proportional to the speed of the shaft 22 for control purposes.

In carrying out the present invention a tachometer generator 24 is also employed which is shown as an alternating current type of tachometer generator although the invention is not limited thereto. The tachometer generator 24, however, is not directly connected to the shaft 22 the speed of which is to be controlled. Instead an auxiliary, variable-slip coupling 25 is interposed, of the type transmitting a torque between a pair of relatively rotatable elements which increases with slip, being zero for zero slip.

The auxiliary, variable-slip coupling 25 may also be an electromagnetic eddy-current slip coupling of the same type and principle of operation as the power transmitting coupling 13. Shown schematically, the auxiliary slip coupling 25 includes a pair of relatively rotatable elements such as an inductor 26, a field structure 27 and a field winding 28 magnetically energizing the structure 27. Means are provided for supplying direct current of adjustable voltage to the winding 28. For this purpose there is shown a source of direct current 29, shown for convenience as a battery of cells, to which is connected a potentiometer 31 having an adjustable tap 32. The winding 28 is connected through a pair of conductors 33 between the potentiometer adjustable tap 32 and an end terminal 34 of the potentiometer 31.

The speed responsive control circuit 14 is designed for responding to the tachometer generator 24 to control the torque transmitted by the coupling in order to maintain a predetermined speed. This speed may be adjusted if suitable adjustments are provided within the speed responsive control circuit 14. The control circuit 14 accomplishes the maintainance of speed by increasing or decreasing the flow of current into the windings 19 of the electromagnetic slip coupling 13 as may be required to effect the requisite variations in the speed of the shaft 22 connected to the load.

When a load is pulsating in character such as the pump 12 great variations in transmitted torque of the coupling 13 would be required to maintain constancy of speed of the shaft 22 during the single rotations of the shaft 22. Moreover, even when employing a motor supplied with a fly wheel 16 difficulties would be encountered in obtaining the requisite variations in torque output of the motor 11 to enable the speed control units 13 and 14 to function properly. Consequently a pulsating load of the character of the pump 12 tends to produce excessive current fluctuations in the speed responsive control circuit 14 and the windings 19.

In accordance with the invention, therefore, I prefer to control the average speed of the load shaft 22 and the load 12 rather than the instantaneous speed to damp out the speed fluctuations before applying the speed signal to the input terminals 35 of the speed responsive control 14. This is accomplished by the adjustable slip of the auxiliary electromagnetic slip coupling 25, which has its driven element 26 connected to the load shaft 22 in a suitable manner as by means of sprockets 36 and 37 and a connecting chain 38.

Figure 3:
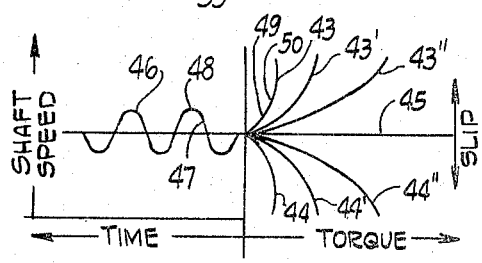
FIG. 3 is a graph explaining the speed torque characteristics of an electromagnetic slip coupling and the manner in which such a coupling is employed for minimizing pulsation effects.

As illustrated in FIG. 3 electromagnetic slip couplings of the type represented by the unit 25 have a drooping slip-torque curve in which the torque measured in a horizontal direction increases but at less than a linear rate with increase in slip measured in the vertical direction on the graph including curves 43 and 44, for example. Slip is measured between the input shaft 39 and the output shape 41. The latter preferably carries a speed stabilizing fly wheel 42 as well as being connected to the tachometer generator 24.

In the graph of FIG. 3 the slip has been plotted, not with respect to zero relative speed between the shafts 39 and 41, but with respect to a speed level 45 which is the average speed which it is desired maintain by the speed responsive control circuit 14 at the load shaft 22. If it be assumed that the shaft 41 on the tachometer generator is running at this predetermined level represented by the horizontal line 45 in FIG. 3, and if the actual speed of the load shaft 22 varies sinusoidally with the theoretical sinusoidal curve 46, then, for a given setting of the potentiometer tap 32, the torque exerted between the relatively rotatable elements 26 and 27 of the slip coupling 25 may be plotted from the graph of FIG. 3. This is done by projecting various points such as the points 47 and 48 from the sinusoidal curve 46 to the slip torque curve 43, the projections intersecting at the points 49 and 50, respectively, on the curve 43.

Although the shaft 41 tends to follow the speed of the shaft 22, it cannot do so instantaneously because of the slip between the shafts 39 and 41 caused by the characteristics of the slip coupling 25 and the torque required to accelerate or decelerate the fly wheel 42. Consequently, as the speed of the shaft 22 represented by the curve 46 fluctuates above and below the mean value 45 which one desires to maintain, the shaft 41 driving the tachometer generator 24 fluctuates to a lesser extent. The slip between the rotatable elements 26 and 27 of the slip coupling 25 reverses as represented by curves 43 and 44 as the load shaft speed fluctuates above and below the desired mean value.

Moreover, since the curves 43 and 44 are not linear but droop with diminishing rate of increase in torque with increasing slip, the "stiffness" of the coupling between shafts 39 and 41 decreases with more violet fluctuations of the speed of the shaft 22. This characteristic further increases the damping effect of the slip coupling 25 and the fly wheel 42 upon the pulsations in speed of the load shaft 22 as transmitted to the tachometer generator shaft 41. It enables the speed responsive control circuit 14 to maintain a desired average speed of the load shaft 22 with minor fluctuations in control voltage applied to the input terminals 35 of the speed responsive control circuit 14. As illustrated by curves 46 and 52 (FIG. 2), representing respectively the speeds of the shafts 39 and 41, pulsations are diminished not only in amplitude but also in frequency, the higher frequency pulsations tending to disappear.

The stiffness of the coupling between the relatively rotatable elements 26 and 27 of the auxiliary slip coupling 25 may be adjusted by adjusting the flow of current in the winding 28 to adjust the torque for a predetermined value of slip. Thus, the curves 43 and 44 of FIG. 3 correspond to a given setting of the potentiometer tap 32, and for different settings different slip-torque curves such as 43', 43" and 44' and 44" are obtained. By varying the adjustment, the desired degree of damping is obtained in order to reduce the pulsations in the curve 52 to a minimum. For example, if the pulsations are less violent or of lower frequency such as might occur for example where the pump 12 was driven through a reduction gear, the potentiometer tap 32 would be set for a larger current value so as to provide greater stiffness of the slip coupling 25 and cause the shaft 41 to follow the load shaft 22 more closely, whereas with very violent or very high frequency pulsations in the load 12 the potentiometer tap 32 would be set for a lower current value to enable the shaft 41 to follow the shaft 22 less closely and damp out pulsations to a greater degree. It will be observed from the curves 43, 43', 43" and so forth in FIG. 3, that along curve 43 for less stiffness of coupling there is a greater rate of change in torque with a given rate of change in slip than in the curve such as 43" for greater stiffness. Consequently, greater damping effect is obtained with the tap 32 set for curve 43.

In FIG. 1 a power transmitting or dynamo electric translating device has been schematically illustrated taking the form of an eddy-current, electromagnetic slip coupling 13. However, the invention is not limited to smoothing out pulsations in systems employing such electromagnetic translating devices, but is applicable also in connection with other electromagnetic translating devices in which torque is transmitted and varies in accordance with the amount of current flowing in a winding. Nor is the invention limited to smoothing out the effect of pulsations in a load device, as it may also be applied in systems where the pulsations occur in the input torque.

In FIG. 2 a system is illustrated in which input torque pulsations are smoothed out. The power input is represented as coming from a prime mover 53 such as an internal combustion engine, steam engine, or other power source having reciprocating elements or energized by pulsating jets of steam, air or the like. In FIG. 2 the electromagnetic translating device takes the form of a dynamometer 54 having a field winding 55. FIG. 2 represents specifically a system for testing the torque and power output of the prime mover 53 at predetermined, selected speeds and the dynamometer may be of conventional form having a field structure 56 cradled in trunnions 57 with suitable balance arms in scales (not shown) for measuring transmitted torque, and a through shaft 58 connected at one end to the prime mover shaft 59 and at the other end to the input shaft 39 of an auxiliary slip coupling 25 of the same type as described in connection with FIG. 1.

As shown in FIG. 2, the speed-responsive, control circuit 14 comprises a current-varying circuit 61 supplying direct current to output terminals 62 connected to the field winding 55 (or 19 through suitable slip rings, not shown) of an electromagnetic translating device such as a dynamometer 54 of FIG. 2 or the field winding 19 of the electromagnetic slip coupling 13 of FIG. 1. A reference voltage source 63 is connected differentially with a speed responsive voltage source 64 to the control element of the current-varying device 61. The speed responsive voltage source 64 is responsive to the tachometer generator 24 having its input terminals 35 connected thereto.

In the specific speed responsive control circuit shown by way of illustration the current-varying device 61 includes a thyratron tube 65 with power supplied by an alternating-current source 66 through a transformer 67. The thyratron 65 has an anode-cathode circuit connected in series with the secondary winding 68 of the transformer 67 and the field winding 55 of the dynamometer 54 through the conductors 62. There is also a rectifier 69 connected across the field winding 55 with a polarity opposite to that of the thyratron 65 in order to carry inductive surges from the field winding 55 during the nonconducting half cycles of the thyratron 65 without subjecting it to excessive inverse voltage.

The thyratron 65 also has a conventional control grid 71.

In order to enable the control circuit to vary the instant in the conducting half cycle of the thyratron 65 when it becomes conducting and thereby control the average value of direct current flowing through the thyratron 65 and the field winding 55, a source of alternating current is provided acting as a rider wave in the control grid cathode circuit of the thyratron 65. This may take the form of an additional secondary winding 72, shown separate but actually a part of the transformer 67.

In order that the output of the secondary winding 72 will be in quadrature with the anode-cathode voltage source supplied by the secondary winding 68, a phase splitting circuit is connected across the winding 72. This consists in the embodiment illustrated of a potentiometer resistor 73 and a condenser 74 in series, with an adjustable tap 75 of the potentiometer 73 serving as the quadrature output terminal. It is connected in series with a current limiting resistor 76 to the control grid 71 of the thyratron 65.

The junction terminal 77 of the potentiometer resistor 73 and the condenser 74 is connected to the output terminal 78 of the reference voltage source 63. The output terminal 79 of the speed responsive source 64 is connected to the cathode of the thyratron 65. The positive terminals of the voltage sources 63 and 64 are effectively connected together through a conductor 81. The output terminals 78 and 79 are thus of the same polarity, so that the voltage sources 63 and 64 are effectively connected in series opposition or differentially in the cathode-control grid circuit of the thyratron 65. Preferably a grid filter condenser 82 is provided.

The reference voltage source 63 comprises another secondary winding 83 of the transformer 67 connected through a dropping resistor 84 and a diode rectifier 85 to a potentiometer resistor 86, having an adjustable tap serving as the adjustable voltage output terminal 78 of the reference voltage source 63. For voltage regulation, a conventional voltage regulator tube 87 is preferably also connected across the potentiometer resistor 86; and filter condensers 88 and 89 are also connected in parallel therewith.

In order to provide an adjustable low bias for the control grid-cathode circuit of the thyratron 65, the junction line 81 of the voltage sources 63 and 64 is not connected directly to the positive terminal of the source 63 but instead to an adjustable potentiometer tap 91 of a potentiometer resistor 92 connected in series with a voltage divider resistor 93 across the potentiometer resistor 86.

The speed-responsive voltage circuit comprises, with the tachometer 24, a step up voltage transformer 94 having a primary winding 95 connected to the input terminals 35 from the tachometer 24 and a secondary winding 96 connected in series with a rectifier 97 to a potentiometer resistor 98, having an adjustable tap serving as the output terminal 79. A condenser 99 is connected across the potentiometer resistor 98 and a filter condenser 101 is connected across the portion of the potentiometer 98 between the adjustable tap 79 and the positive line 81.

It will be seen that in the control grid-cathode circuit of the field-current-controlling thyratron 65, a circuit may be traced from a control grid 71 through the resistor 76, the tap 75 of the potentiometer 73 through a portion of that potentiometer to the terminal 77, a conductor 102, the output terminal, potentiometer tap 78 of the reference voltage source 63, a portion of the potentiometer resistor 86, a conductor 100, positive terminal 103 of the reference voltage source 63, a portion of the potentiometer 92, low bias setting potentiometer tap 91, the conductor 81, the positive terminal 104 of the speed responsive control circuit 64, a portion of the potentiometer 98, the speed responsive voltage output terminal and potentiometer tap 79, through a conductor 105 to the cathode of the thyratron 65. The potentiometer 73 serves as a sensitivity adjusting potentiometer, the potentiometer 86 for the speed reference control, and the potentiometer 98 for maximum speed control.

If desired, a tachometer feedback control may also be provided comprising a rheostat 106 in series with a resistor 107 and preferably also a deflecting-pointer alternating-current galvanometer or milliammeter 108. Adjustment of the rheostat 106 serves to control the tachometer feedback.

The deflecting pointer instrument 108 is preferably of the undamped or underdamped type so that it serves not only for enabling proper settings of the rheostat 106 to be duplicated by observing the reading of the instrument 108 but also for indicating the magnitude of fluctuations in the voltage output of the tachometer 24. The adjustment for minimum pulsation effect in the system is then made by adjusting the damping control potentiometer tap 32 of the auxiliary slip coupling 25 until the pointer of the instrument 108 oscillates over the minimum length of scale thereof.

In tracing the control grid-cathode circuit of the thyratron 65 it will be observed that going from the cathode the voltage rises through the potentiometer 98 rises further through the low bias potentiometer 92 and falls again through the reference voltage potentiometer 86. Consequently, when the voltage wave of the rider wave potentiometer 73 is passing through zero the algebraic sum of the voltages of the taps 79, 78 and 91 is acting in the control grid circuit. If the speed of the tachometer increases, the potential of the control grid 71 is raised, enabling the rider wave from the potentiometer 73 to lift the potential of the control grid 71 of the thyratron 65 to firing potential earlier in the cycle, so as to increase the average current through the field winding 55. This places more load upon the dynamometer 54 and the prime mover 53 so as to slow down the shaft 58 and restore the average speed of the shaft to the desired predetermined value.

It will be understood that in the case of a dynamo electric translating device such as the eddy-current slip clutch 13 of FIG. 1 driving a load instead of one loading a prime mover as in FIG. 2, the polarities of the reference voltage source 63 and the speed responsive voltage source 64 would be reversed, so that when the load shaft 22 fell off in average speed, causing the tachometer speed to fall off, more current would be applied to the field winding 19 of the coupling 13 so as to increase the coupling effect and increase the speed of the load shaft 22.

The arrangement also permits the kinetic energy-storage properties of the fly wheel 42 to diminish pulsations of the shaft 22 or 58 by reason of the elastic connection of the fly wheel to the shaft. This permits the motive power of the motor 11 or the engine 53 to keep the shaft rotating, but independently thereof supplies additional energy to bring up shaft speed resiliently when the shaft is opposed by a torque pulse and conversely, to hold down shaft is subjected to a driving pulse.

Certain embodiments of the invention and certain methods of operating embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is clamied is:

1. A pulsation damper for a dynamo electric translating device subject to pulsating torques and having a shaft comprising in combination with the shaft, a field winding for the dynamo electric translating device for controlling the shaft torque thereof, a fly wheel, a slip coupling interposed between the shaft of the dynamo electric translating device and the fly wheel, and means responsive to the fly wheel speed for regulating current in said field winding.

2. A pulsation damper for the shaft of a dynamo electric translating device subject to pulsating torques comprising in combination a field winding for the dynamo electric translating device for controlling the torque thereof, a tachometer generator, a slip coupling interposed between the shaft of the dynamo electric translating device and the tachometer generator, the tachometer generator being operatively electrically connected to the said field winding for regulating the shaft speed of the dynamo electric translating device.

3. In a system for testing at a predetermined speed a prime mover supplying a pulsating torque, a dynamometer having a shaft connected to the prime mover and a field winding carrying current the magnitude of which determines the torque of the dynamometer, a fly wheel, a slip coupling interposed between the shaft of the dynamometer and the fly wheel, and means responsive to the fly wheel speed for regulating current in the winding of the dynamometer.

4. In a system including a motor driving a load presenting a pulsating opposing torque, means for damping pulsation comprising in combination with the motor, a load shaft and a current responsive coupling interposed between the motor and the load shaft, said coupling having a field winding carrying current the magnitude of which regulates the torque transmitted by the coupling, a slip coupling having a pair of relatively rotatable members, one of which is driven by said load shaft and the other of which has a fly wheel connected thereto, and means responsive to deviation of the speed of the fly wheel from a predetermined value for varying the flow of current in the field winding of the first-mentioned current-responsive coupling.

5. A pulsation damper for the shaft of a dynamo electric translating device subject to pulsating torques comprising in combination a field winding for the dynamo electric translating device for controlling the torque of the dynamo electric translating device, a fly wheel, an eddy current coupling interposed between the shaft of the dynamo electric translating device and the fly wheel, said eddy current coupling having a field winding with means for supplying current thereto and means for adjusting the magnitude of the field current of the eddy current coupling for damping control, a tachometer generator connected to the fly wheel, a reference voltage source set at a value corresponding to a predetermined shaft speed which it is desired to maintain in the dynamo electric translating device and means differentially responsive to the tachometer generator and reference voltage source for regulating the flow of current in the field winding of the dynamo electric translating device to maintain the shaft speed thereof at a predetermined value corresponding to the setting of the reference voltage.

6. A pulsation damper comprising,
    a first rotatable shaft which is subject to pulsating torque,
    a second rotatable shaft,
    a slip coupling interposed between said first and second shafts for applying corrective torque to said first shaft for continuously compensating for the effect of pulsations, and
    means for driving said first shaft independently of its connection to said slip coupling.

7. The pulsation damper in claim 6 wherein the slip coupling comprises two relatively rotatable members whereby the torque transmitted between said members increases with increasing slip.

8. The pulsation damper in claim 6 including means connected to said slip coupling for variably controlling the degree of damping of said pulsations.

9. In a system for testing at a predetermined speed a prime mover supplying a pulsating torque, a dynamometer having a shaft connected to the prime mover and a field winding carrying curent the magnitude of which determines the torque of the dynamometer, a fly wheel, an electromagnetic slip coupling interposed between the shaft of the dynamometer and the fly wheel, said slip coupling having a winding carrying current the magnitude of which determines the torque transmitted by the slip coupling, adjustable means for supplying current to said slip coupling winding, a tachometer connected to the fly wheel having a voltage output varying with fly wheel speed, a reference voltage source having value corresponding to a predetermined speed to be maintained, and means differentially responsive to the reference voltage source and the tachometer generator for regulating the current in the winding of the dynamometer.

10. In a system including a motor driving a load presenting a pulsating opposing torque, means for damping pulsation comprising in combination with the motor, a load shaft, an electromognetic, eddy-current slip coupling interposed between the motor and the load shaft, said coupling having a field winding carrying current the magnitude of which regulates the torque transmitted by the coupling, an auxiliary electromagnetic slip coupling having a pair of relatively rotatable members, one of which is driven by the said load shaft and the other of which has a flywheel connected thereto, one of said members having a field winding carrying a current the magnitude of which determines the magnitude of torque transmission between the relatively rotatable members of the auxiliary coupling, means responsive to deviations of the speed of the fly wheel from a predetermined value for varying the flow of current in the field winding of the first mentioned electromagnetic eddy current slip coupling, and means for adjusting magnitude of the flow of current in the field winding of the auxiliary slip coupling for reducing pulsations to a minimum and minimizing pulsations in the regulation of the first mentioned electromagnetic slip coupling.

11. In a drive for a load opposing the drive with a pulsating torque, a pulsation damping system comprising in combination a drive motor, a load shaft, a first coupling interposed between the motor and shaft having a field winding carrying a current, the magnitude of which regulates the torque transmitted to the shaft by the motor, a second coupling having a pair of relatively rotatable members, the torque between which varies with the slip between the relatively rotatable members, a speed responsive current generator, one of said relatively rotatable members being connected to the load shaft and the other being connected to the speed-responsive current generator, a control interposed between the speed responsive current generator and the field winding of the first mentioned coupling responsive to deviation from a predetermined speed of said speed responsive current generator, whereby pulsations in the field winding of the first mentioned coupling are damped.

References Cited

UNITED STATES PATENTS

| 732,062 | 6/1903 | Entz | 310—95 X |
| 1,186,851 | 6/1916 | Severy | 310—95 X |

MILTON O. HIRSHFIELD, *Primary Examiner.*

D. X. SLINEY, *Assistant Examiner.*